(12) United States Patent
Wako et al.

(10) Patent No.: US 6,415,224 B1
(45) Date of Patent: Jul. 2, 2002

(54) DISPLAY METHOD AND APPARATUS FOR NAVIGATION SYSTEM

(75) Inventors: Hikaru Wako, Redondo Beach; Tatsuo Yokota, Torrance, both of CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/777,990

(22) Filed: Feb. 6, 2001

(51) Int. Cl.⁷ .................... G01C 21/00; G06F 7/00; G06F 9/00; G06F 17/00; G06F 165/00; G01S 5/02

(52) U.S. Cl. ............... 701/208; 701/200–207; 701/209–216; 701/23–26; 701/36; 342/357.13; 342/357.09; 342/357.17; 342/458; 340/988; 340/990; 340/995; 340/903; 345/970; 345/1.3; 345/856; 345/555; 345/205; 345/206; 455/556; 455/557; 348/169; 348/142; 348/213

(58) Field of Search ................. 701/200–216, 701/23, 24, 25, 27, 14, 36; 342/357.13, 357.09, 357.17, 357.08, 357.06, 458; 240/988, 990, 995, 903, 660, 692, 460; 345/970, 1.3, 856, 555, 205, 206; 455/556, 557; 348/169, 142, 213

(56) References Cited

U.S. PATENT DOCUMENTS

| | | | |
|---|---|---|---|
| 5,648,904 A | * | 7/1997 | Scott ................... 116/62.3 |
| 5,757,359 A | | 5/1998 | Morimoto et al. |
| 5,764,139 A | | 6/1998 | Nojima et al. |
| 5,821,880 A | * | 10/1998 | Morimoto et al. ......... 340/988 |
| 5,944,768 A | * | 8/1999 | Ito et al. ................... 340/990 |
| 6,029,072 A | * | 2/2000 | Barber ..................... 455/556 |
| 6,064,322 A | * | 5/2000 | Ohira ....................... 340/988 |
| 6,121,900 A | * | 9/2000 | Takishita ................. 340/990 |
| 6,240,361 B1 | * | 5/2001 | Ise et al. .................. 340/995 |
| 6,275,231 B1 | * | 8/2001 | Obradovich ............. 345/970 |
| 6,034,212 A1 | * | 10/2001 | Aoki et al. ........... 342/357.13 |
| 2001/0001846 A1 | * | 5/2001 | Uchigaki |
| 2001/0029429 A1 | * | 10/2001 | Katayama et al. |
| 2001/0047241 A1 | * | 11/2001 | Khavakh et al. |

OTHER PUBLICATIONS

Phillips Car System "Carin Navigation System". Apr. 17, 1997.*

* cited by examiner

Primary Examiner—William A. Cuchlinski, Jr.
Assistant Examiner—Ronnie Mancho
(74) Attorney, Agent, or Firm—Muramatsu & Associates

(57) ABSTRACT

A display method and apparatus for navigation system for displaying information necessary for guiding a driver of a vehicle. The navigation system is designed to promote safe driving by producing different display forms and contents depending on whether the vehicle is in motion or stationary. When the vehicle is stationary, the navigation system can perform all of the functions. However, when the vehicle is in motion, the navigation system provides simplified and limited functions to ease the operations. The number of key strokes required for operating the navigation system is reduced when the vehicle is in motion.

36 Claims, 14 Drawing Sheets

Fig. 2A (Prior Art)
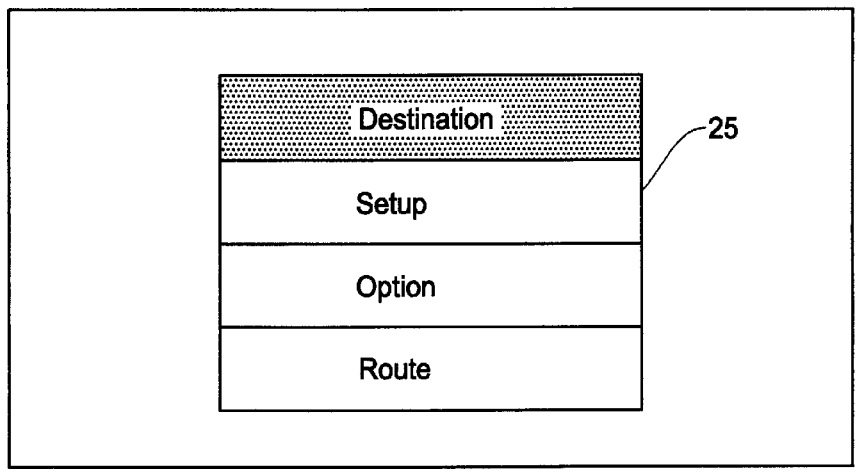
Fig. 2B (Prior Art)
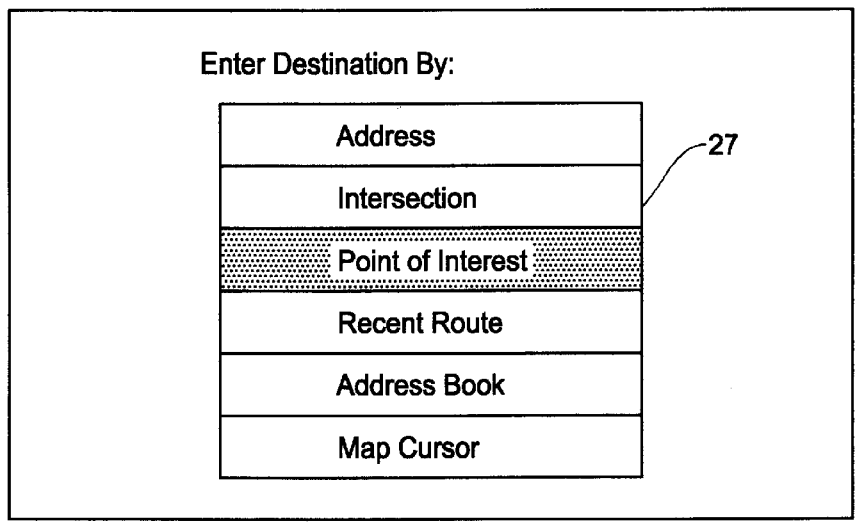
Fig. 2C (Prior Art)
| Category List | |
|---|---|
| Recreation | Input Category |
| Bank | Hotel |
| Emergency | Gas Station |
| Restaurant | Shopping |
| Travel | Automotive |
| Park | Theater |

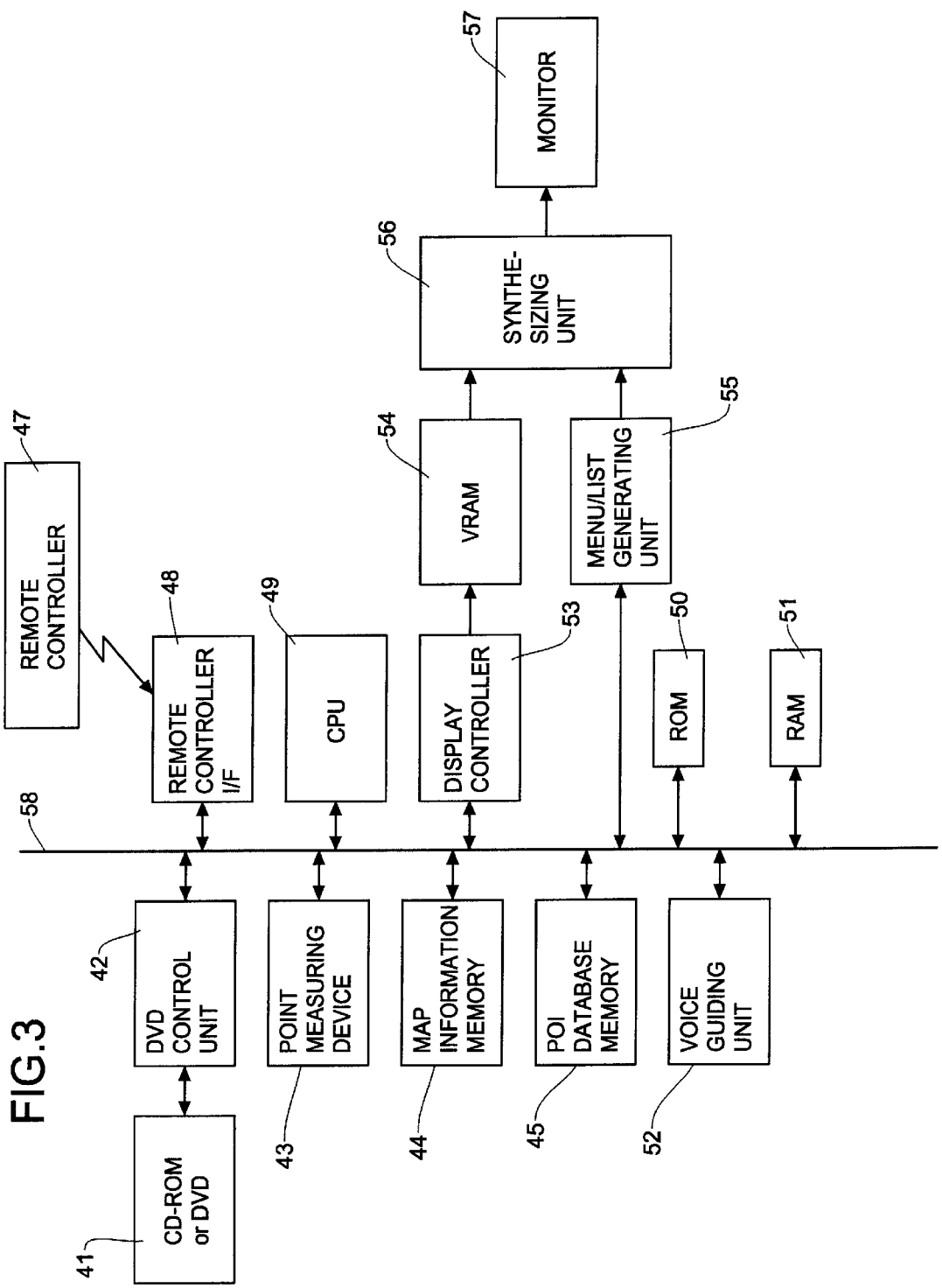

DISPLAY METHOD AND APPARATUS FOR NAVIGATION SYSTEM

FIELD OF THE INVENTION

This invention relates to a display method and apparatus for navigation system for displaying information necessary for guiding a driver of a vehicle, and more particularly, to a display method and apparatus for navigation system for displaying information in different forms and contents depending on whether the vehicle is in motion or stationary.

BACKGROUND OF THE INVENTION

A vehicle navigation system performs vehicle travel guidance for enabling a driver to easily drive the vehicle to a selected destination. Such a navigation system detects the position of the vehicle, reads out map data pertaining to an area at the vehicle current position from a data storage medium, for example, a CD-ROM (compact disk read-only memory) or a DVD (digital videodisc), and displays a map image on a monitor (display) screen while superposing a mark representing the current location of the vehicle on a predetermined portion of the map image.

The vehicle position is determined by a self-contained navigation sensors (e.g. a distance traveled sensor and a bearing sensor) mounted in the vehicle or by a global positioning system (GPS) including a satellite (satellite navigation). The satellite navigation enables absolute position detection and higher position accuracy than the self-contained navigation sensors. However, the satellite navigation involves problem of position detection failure such as in a tunnel or a building where the satellite radio signals are obstructed. Therefore, recent navigation systems utilize both self-contained navigation and satellite navigation to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the image. In either methods, the navigation system enables the driver to recognize the map information of the area at the vehicle position at a glance.

When a destination is not set, such a navigation system functions as a locator map which indicates the current location of the vehicle in a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a starting point and a destination are input, a CPU in the navigation system automatically determines a most suitable guided route and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

FIG. 1A shows an example of a locator map display containing a vehicle current position mark VCP on a map image 21. Typically, a navigation system highlights the street on which the vehicle is running in the map image 21 and shows a name of the street such as "W 190TH ST" in an information box 23 on the display screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

FIG. 1B shows an example of route guidance display which performs the route guidance function. The route guidance display is activated after specifying the destination of travel. In addition to the map image 21 similar to the locator map of FIG. 1A, this example further shows an arrow indicating the direction (left) in which the vehicle is to turn at the intersection in a guidance information box 22 at the top of the screen. The guidance information box 22 also shows a name of the street "PREIRIE AVE" which intersects with the current street "W 190TH ST" and a distance to the intersection. Thus, the navigation system indicates that the vehicle should make a left turn at the intersection with "PREIRIE AVE". Typically, the current street "W 190TH ST" and the left side of the street "PREIRIE AVE" will be highlighted in the map image 21. Further, such route guidance is accompanied by spoken instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

In order to be guided by the route guidance mode such as shown in FIG. 1B, a destination must be specified in the navigation system so that the system can find one or more routes to get to the destination. FIGS. 2A–2F show examples of display shown on the screen during the operation of inputting the destination.

By operating a menu key, a main menu 25 such as shown in FIG. 2A is displayed on the navigation system and a menu item "Destination" is selected from the main menu. This allows the navigation system to display a "Enter Destination by" menu 27 as shown in FIG. 2B for specifying an input method for selecting the destination. The "Enter Destination by" menu 27 lists various methods for selecting the destination including "Address" for specifying the city and address of the destination, "Intersection" for specifying the names of two streets in the city which intersect with one another, and "Point of Interest" for selecting the programmed destination based on the category or telephone number. Other methods in the "Enter Destination by" menu 27 include "Recent Route" for specifying the destination based on the recent destinations saved in the navigation system, "Address Book" for selecting the address of the destination out of the addresses stored in the system, and "Map Cursor" for specifying the destination by pointing a cursor to the destination on the map.

When selecting the "Point of Interest" in FIG. 2B, the navigation system displays a "Category List" menu 28 such as shown in FIG. 2C. The "Category List" menu 28 contains various different categories such as "Bank", "Restaurant", "Hotel", "Shopping" and others. Supposing the category "Shopping" is selected, the navigation system displays a "Name List" such as shown in FIGS. 2D and 2E. The "Name List" shows names of shops and shopping malls sorted by, for example, distance from the vehicle. In an address information box 31 on the display, the address and phone number of the highlighted name in the list 33 will be displayed. The address information box 31 may also show the distance to the highlighted shop. Typically, the navigation system stores several tens or hundreds of names of shops within predetermined distances and displays several shops per page of display screen, and a user may scroll the display screen to see other names of shops in the name list 36 such as shown in FIG. 2E.

When the destination is not prestored in the navigation system, a user can input the destination by selecting, for example, the "Address" method or "Intersection" method in the "Enter Destination by" menu 27 of FIG. 2B. Then, the navigation system displays an "Enter Street Name" shown in FIG. 2E for inputting the city and address in an address input box 37 by means of a key board 38 displayed on the display screen.

After inputting the destination, the navigation system determines a route to the destination based on, for example, by finding the shortest way to reach the destination. In the conventional navigation system, the foregoing process of specifying the destination can be done either the vehicle is running or stationary. While driving, a driver may want to change the destination or to set a new destination after reaching the original destination.

As noted above, the operation of the navigation system, such as inputting the destination, requires the driver to look at the information on the display screen such as shown in FIGS. 2A–2C, or scroll the display such as shown in FIGS. 2D and 2E, or even input the destination through the key board such as shown in FIG. 2F. Thus, the navigation system may distract the driver's attention from safe driving. Therefore, for maintain safe driving, it is necessary to simplify the operation of the navigation system while the vehicle is in motion. In the industry, there is an unofficial rule that an operation of a navigation system by a driver must be done less than fifteen seconds.

SUMMARY OF THE INVENTION

It is, therefore, an object of the present invention to provide a display method and apparatus for vehicle navigation system which enables a driver to operate the navigation system within a short period of time without inversely affecting the driving of the vehicle.

It is another object of the present invention to provide a display method and apparatus for vehicle navigation system which displays information in different forms and contents depending on whether the vehicle is in motion (running) or stationary (standing still).

It is a further object of the present invention to provide a display method and apparatus for vehicle navigation system which is able to specify the destination of travel by a smaller number of key movements (clicks) when the vehicle is in motion than that when the vehicle is stationary.

The display method and apparatus of the navigation system is designed to promote safe driving by differentiating display formats and contents depending on whether the vehicle is in motion or stationary. When the vehicle is stationary, the navigation system can perform all of the functions. However, when the vehicle is in motion, the navigation system provides simplified and limited functions to ease the operations. The number of key strokes required for operating the navigation system is reduced when the vehicle is in motion.

In one aspect of the present invention, a display method of a vehicle navigation system includes steps of detecting whether a vehicle is in motion or stationary and sending a corresponding signal to a controller of the navigation system, changing a display screen of the navigation system to an in-motion main menu when the vehicle is in motion and a menu key is pressed by the driver, changing the display screen of the navigation system to a stationary main menu when the vehicle is stationary and the menu key is pressed by the driver. The in-motion main menu displays an item list showing less than a predetermined number, for example ten, of items in one page of a display screen in which the items are limited to methods for specifying a destination of travel.

In the in-motion main menu or other menus displayed when the vehicle is in motion, a display scroll function for the menus is disabled. Further, in the in-motion main menu or other menus displayed when the vehicle is in motion where each of the menus lists a plurality of items, an initial highlight position is on an item at about a middle point of the item list.

In the further aspect, the display method of the present invention includes a step of displaying a locator map screen when the destination of travel is not set in the navigation system, wherein the locator map screen displays a map image of an area within a predetermined distance from the vehicle and a vehicle current position mark in the map image showing a current position of the vehicle and a street image on which the vehicle is running.

In a further aspect of the present invention, the display method of the present invention includes a step of displaying a route guidance screen when the destination of travel is set and an appropriate route to the destination is determined by the navigation system, wherein the route guidance screen displays a map image of an area within a predetermined distance from the vehicle and a vehicle current position mark in the map image showing a current position of the vehicle, an image of a current street on which the vehicle is running, a name of a cross street on which the vehicle is to make a turn, and a direction of the turn on the cross street.

A further aspect of the present invention is a display apparatus of a vehicle navigation system. The display apparatus includes means for detecting whether a vehicle is in motion or stationary and sending a corresponding signal to a controller of the navigation system, means for changing a display screen of the navigation system to an in-motion main menu when the vehicle is in motion and a menu key is pressed by the driver, means for displaying in-motion break down menus specifically made for use when the vehicle is in motion where the break down menus starts from the in-motion main menu, means for changing the display screen of the navigation system to a stationary main menu when the vehicle is stationary and the menu key is pressed by the driver, and means for displaying stationary break down menus made for use when the vehicle is stationary where the stationary break down menus starts from the stationary main menu. Each of the in-motion main menu and the in-motion break down menus displays an item list in one page of a display screen for which a display scroll function is disabled when the vehicle is in motion.

According to the present invention, the display method and apparatus for vehicle navigation system enables the driver to operate the navigation system within a short period of time without inversely affecting the safe driving of the vehicle. The vehicle navigation system displays information in different forms depending on whether the vehicle is in motion or stationary. The navigation system is able to specify the destination of travel by a small number of key movements when the vehicle is in motion.

BRIEF DESCRIPTION OF THE DRAWINGS

FIGS. 2A–2F are schematic diagrams showing display examples of a vehicle navigation system. FIG. 2A is a main menu, FIG. 2B is a destination set menu, FIG. 2C shows a list of category when setting a point of interest in FIG. 2B, FIGS. 2D and 2E show name lists in the category specified in FIG. 2C, and FIG. 2F shows a key board display for entering the address or intersection.

FIG. 3 is a block diagram showing an example of structure in the vehicle navigation system according to the present invention.

DETAILED DESCRIPTION OF THE PREFERRED EMBODIMENTS

The navigation system of the present invention is designed to promote safety in driving a vehicle by producing different display modes and contents depending on whether the vehicle is in motion (running or driving) or in stationary (standing still). When the vehicle is stationary, the navigation system can perform all of the functions provided. However, when the vehicle is in motion, the navigation system provides simplified and limited functions to ease the operations. The navigation system is designed to reduce the number of key strokes when the vehicle is in motion.

Figure 5:
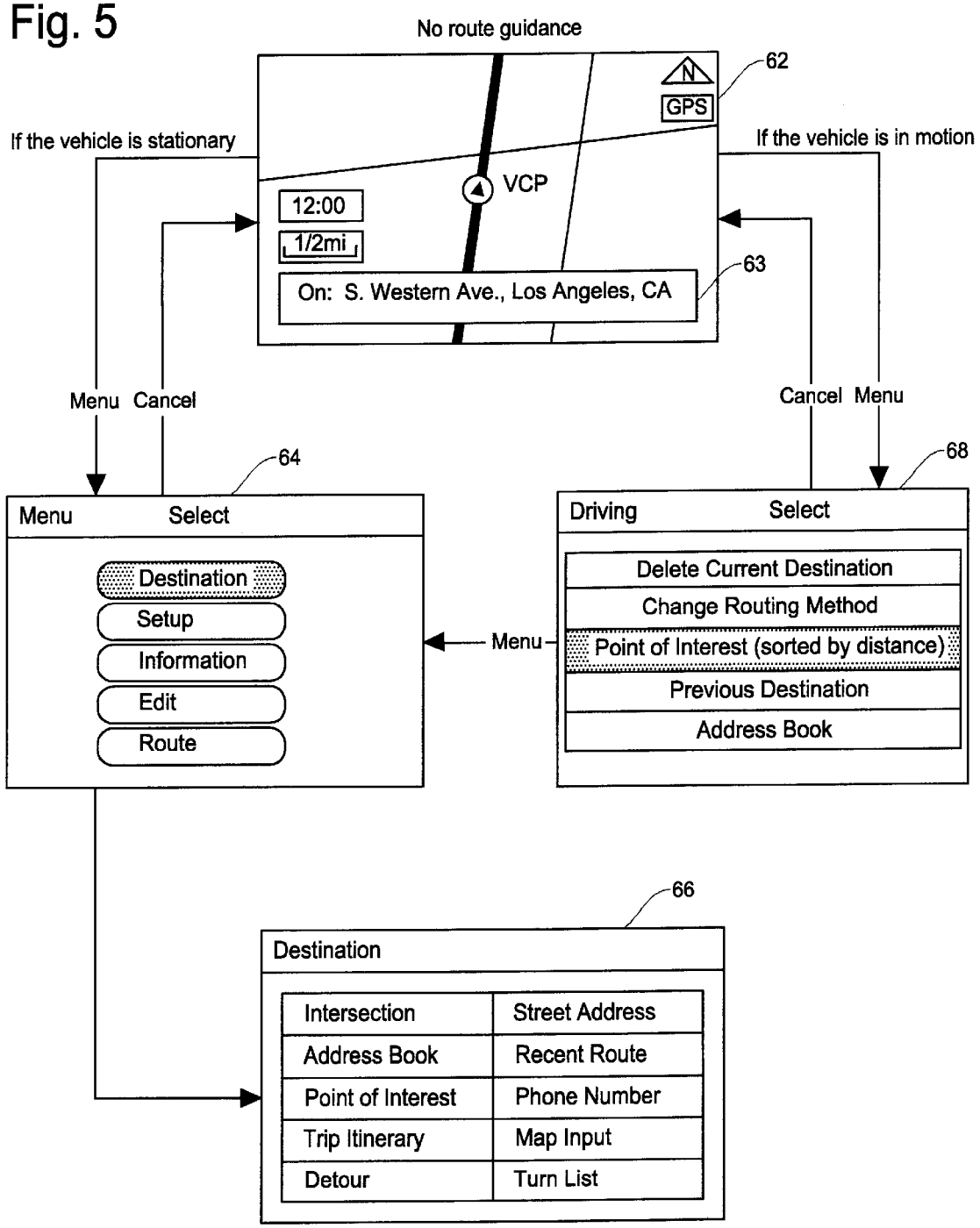
FIG. 5 is a schematic diagram showing an example of displayed images and operation flow in the navigation system of the present invention, which is dependent upon whether the vehicle is in motion or stationary, when the destination is not specified.

Examples of operational flows and associated displays in the navigation system of the present invention are shown in FIGS. 5–13. As noted above, the display images and contents in the images vary depending on whether the vehicle is in motion or stationary. FIG. 5 shows a situation where the destination is not specified in the navigation system. Thus, a locator map screen 62 does not involve a route guidance function. In FIG. 5, if the vehicle is stationary, the navigation system displays a main menu (stationary main manu) 64 to select one of the main menu items including "Destination", "Setup", "Edit" and etc. If the "Destination" is selected, the navigation system displays a "Enter Destination by" menu 66 showing various methods of entering the destination. In this manner, the navigation system provides layers of menu (stationary break down menus) for entering the destination.

In contrast, if the vehicle is in motion, the navigation system displays an in-motion main menu 68 which lists limited menu items for specifying the destination. The number of items displayed on one screen is limited, for example, to ten or less, preferably five or seven, and no scroll of display is available. Each of the menus in the lower layers (in-motion break down menus) such as shown in FIGS. 10–13 is also limited to only one page screen and no display scroll is available.

Figure 4:
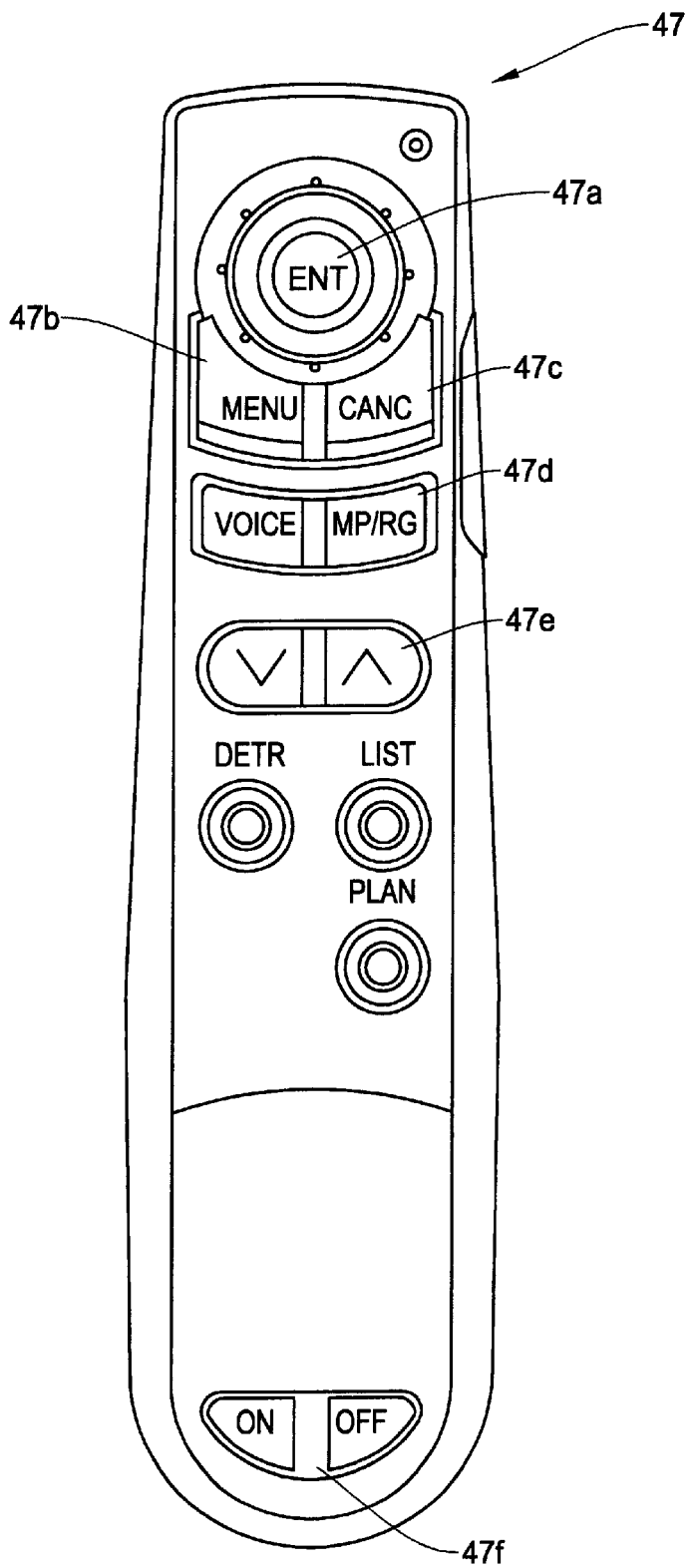
FIG. 4 is a diagram showing an example of a remote controller accompanied by the vehicle navigation system of the present invention.

Before going into details of the display examples of FIGS. 5–13, a brief description is given regarding the basic structure of the navigation system with reference to FIG. 3 and an example of remote controller for the navigation system with reference to FIG. 4. In the block diagram of FIG. 3, the navigation system includes a map storage medium 41 such as a CD-ROM or DVD (hereafter "DVD") for storing map information, a DVD control unit 42 for controlling an operation for reading the map information from the DVD, a point measuring device 43 for measuring the present vehicle position which has a vehicle speed sensor for detecting a moving distance, a gyro for detecting a moving direction, a microprocessor for calculating a position, a GPS receiver, and etc., a map information memory 44 for storing the map information which is read out from the DVD 41, a database memory 45 for storing database information such as point of interest (POI) information which is read out from the DVD 41. The navigation system determines whether the vehicle is in motion or stationary based on, for example, a signal from the vehicle speed sensor in the point measuring device 43.

The navigation system further includes a remote controller 47 for executing a menu selection operation, an enlarge/reduce operation, a destination input operation, etc. and a remote controller interface 48. As shown in FIG. 4, the remote controller 47 includes a joystick/enter key 47a, a menu key 47b, a cancel key 47c, an MP/RG key 47d, a zoom/scroll key 47e, a monitor ON/OFF key 47f, and so on. The joystick/enter key 47a has a function as a joystick key for moving the cursor or vehicle current position mark, etc., relatively in one of eight directions in the map or moving a menu bar (highlight) when selecting a desired menu item, and a function as an enter key for setting and inputting the cursor point and selecting and inputting the menu. Therefore, the joystick/enter key 47a will be also labeled simply as a joystick or enter key hereinafter.

The menu key 47b is operated when displaying a main menu (stationary) or an in-motion main menu (in motion), and the cancel key 47c cancels the present displayed screen or is operated when returning the screen to an initial screen of the menu. The MP/RG key 47d is operated when switching guiding modes (map guide mode and arrow mode), and when enlarging/reducing the map and vertically shifting the highlight point in various lists. The zoom/scroll key 47e is operated when changing map magnification ratio upward or downward or scrolling listings on the display screen.

Referring back to FIG. 3, the navigation system further includes a processor (CPU) 49 for controlling an overall operation of the navigation system, a ROM 50 for storing various control programs such as a route search program and a map matching program necessary for navigation control, a RAM 51 for storing a processing result such as a guide route, a voice guiding unit 52 for guiding a traveling direction at a crossroad with spoken instructions, a display controller 53 for generating map images (such as a map guide image and an arrow guide image) on the basis of the map information, a VRAM 54 for storing the images generated by the display controller 53, a menu/list generating unit 55 for generating menu image/various list images, a synthesizing unit 56 for synthesizing images from the VRAM 54 and the menu/list generating unit 55, a monitor (display) 57, and a bus 58 for interfacing the above listed units in the navigation system.

Referring back to FIG. 5, when the navigation system is activated, the system displays the locator map screen 62 showing a vehicle current position mark VCP in the map image. The locator map screen 62 also shows an information box 63 indicating the name of the current street on which the vehicle is running. Typically, the current street is highlighted or enlarged in the map image. Other information such as a current time, a map scale and a north pointer N are also shown in the locator map screen 62.

By pressing the menu key 47b of the remote controller 47, the system displays the main menu (stationary main menu) 64 if the vehicle is stationary. The main menu 64 lists several items including "Destination" for specifying the destination of travel, "Setup" for setting up the navigation system with a particular vehicle, adjusting various parameters such as system calibration, or forming sets of information to be displayed when the vehicle is in motion, "Information" to view various information including GPS status, and "Edit" for editing route information. Preferably, at default, the menu bar highlights the "Destination" since this item is most frequently used. By pressing the cancel key 47c, the display goes back to the locator map screen 62.

By selecting the "Destination" in the main menu 64 by the joystick key 47a, the navigation system displays an "Enter Destination by" menu 66 which shows a list of methods for entering the destination. More methods may be listed to be shown in one page or two or more pages which is scrolled with use of the zoom/scroll key 47e. The user selects one of the methods in the menu 66 such as "Point of Interest" by positioning the menu bar with use of the joystick key 47a to proceed to further break down the destination. Such a procedure is basically the same as the category lists and name lists shown in FIGS. 2C–2F (stationary break down menus). Typically, the name list includes such as several hundred names and addresses, within a predetermined distance, which are displayed by scrolling the pages of the display screen. It should be noted that these are merely examples and there are many other ways of attaining the same result of defining the destination.

If the vehicle is in motion, by pressing the menu key 47b, the navigation system displays the in-motion main menu 68 which only provides methods of determining the destination. Namely, no setup or edit functions are included in the main menu when the vehicle is in motion. By pressing the cancel key 47c, the display goes back to the map locator screen 62. If the vehicle stops, in the in-motion menu 68, the navigation system displays the stationary main menu 64 if the menu key 47b is pressed.

Figure 1A:
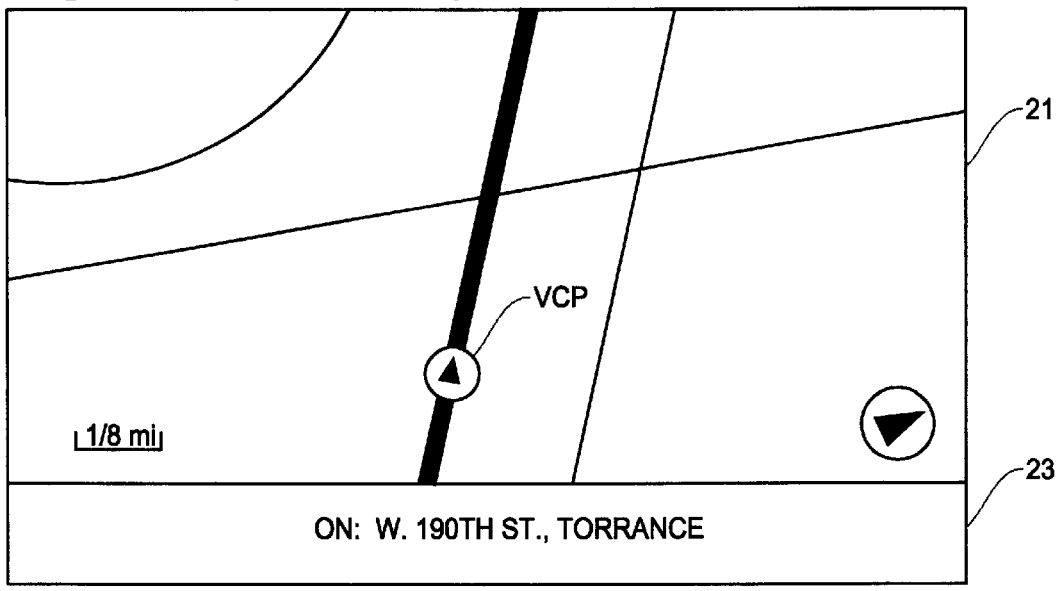
FIGS. 1A and 1B are schematic diagrams showing an example of locator map display and route guidance display, respectively, of a vehicle navigation system.
Figure 1B:
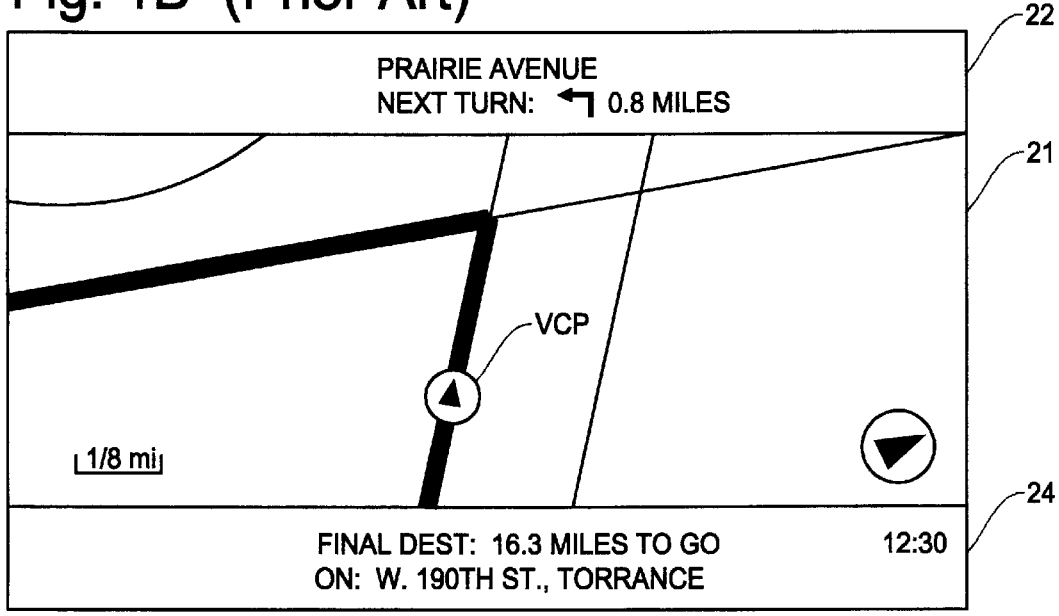
Figure 2D:
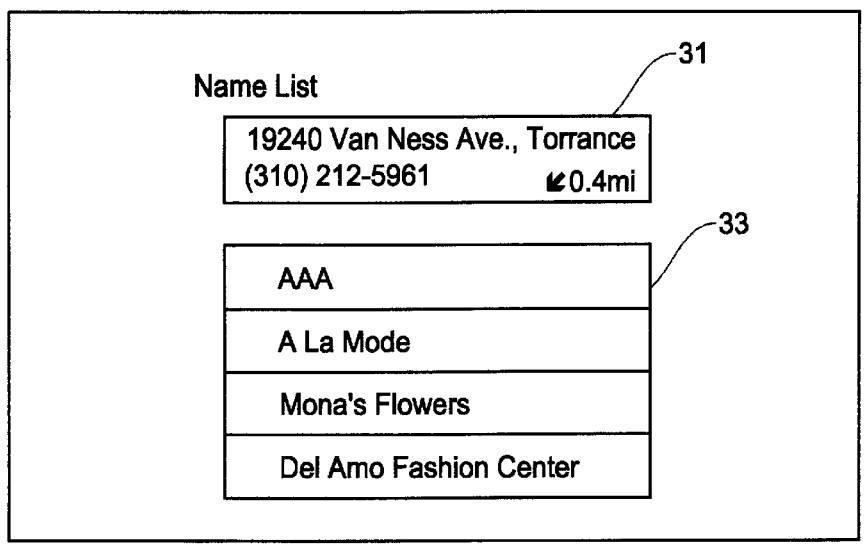
Figure 2E:
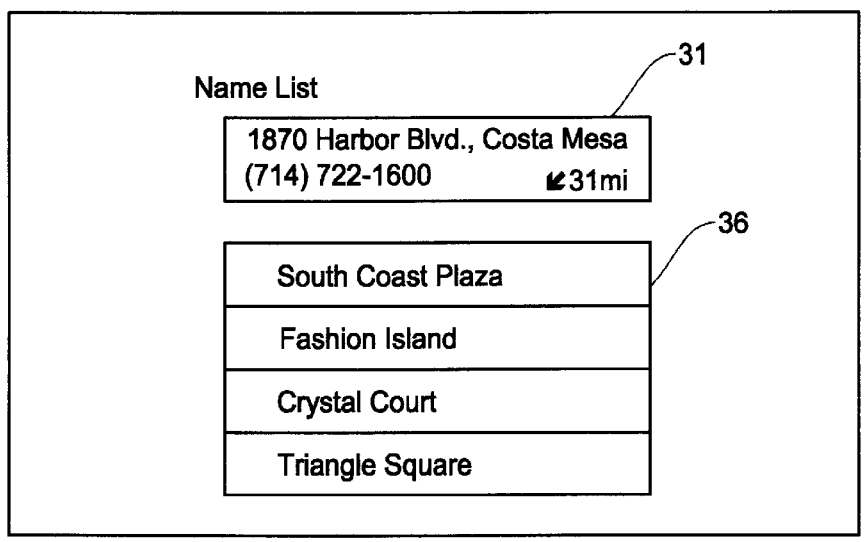
Figure 2F:
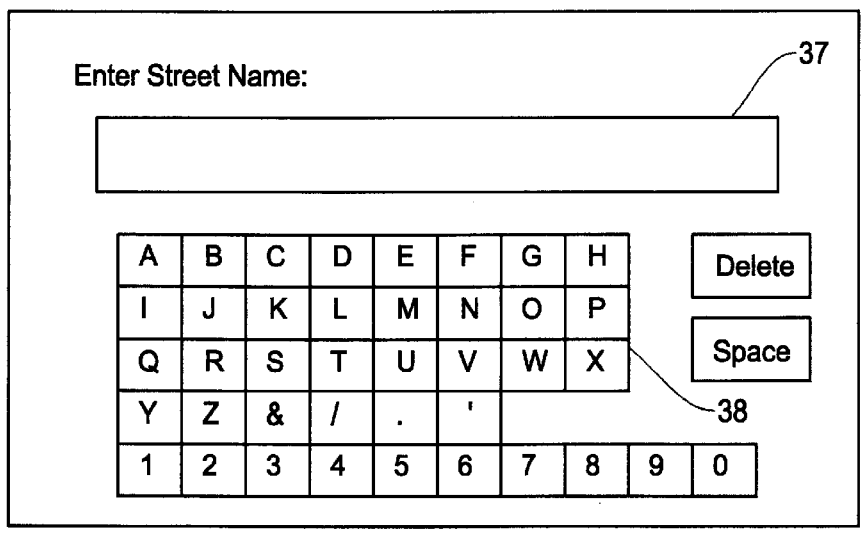

In the example of FIG. 5, the in-motion (driving) main menu 68 lists only three methods of inputting the destination, i.e., "Point of Interest", "Previous Destination" and "Address Book" which are considered to be most essential and frequently used input methods in the navigation system. The input method which requires typing alphabetic characters or numbers through the keyboard screen such as shown in FIG. 2F is not available in the in-motion main menu. This is because such an input method is more difficult to used than the other input methods for the driver and needs a longer time to finish. There are other items "Delete Current Destination" and "Change Routing Method" in the in-motion main menu 68, however, in the situation of FIG. 5, these two items are inactive because no destination is set in the navigation system.

Preferably, at default, the menu bar (highlight) is positioned at about the middle point of the in-motion (driving) main menu 68 so that any item in the list can be selected less than two clicks of the joystick 47a in either the upward or downward direction. Further, it is preferable that the most frequently used item is positioned at the center of the list and the next frequently used items are positioned at upper and lower positions adjacent to the most frequently used item, and so on. In this arrangement, the most frequently used item is highlighted at default and can be selected by simply pressing the enter (joystick) key 47a. The next frequently used item is highlighted by one click action of the joystick key 47a. Similarly, the further next frequently used items are highlighted by two click actions of the joystick key 47a, and so on.

Figure 6:
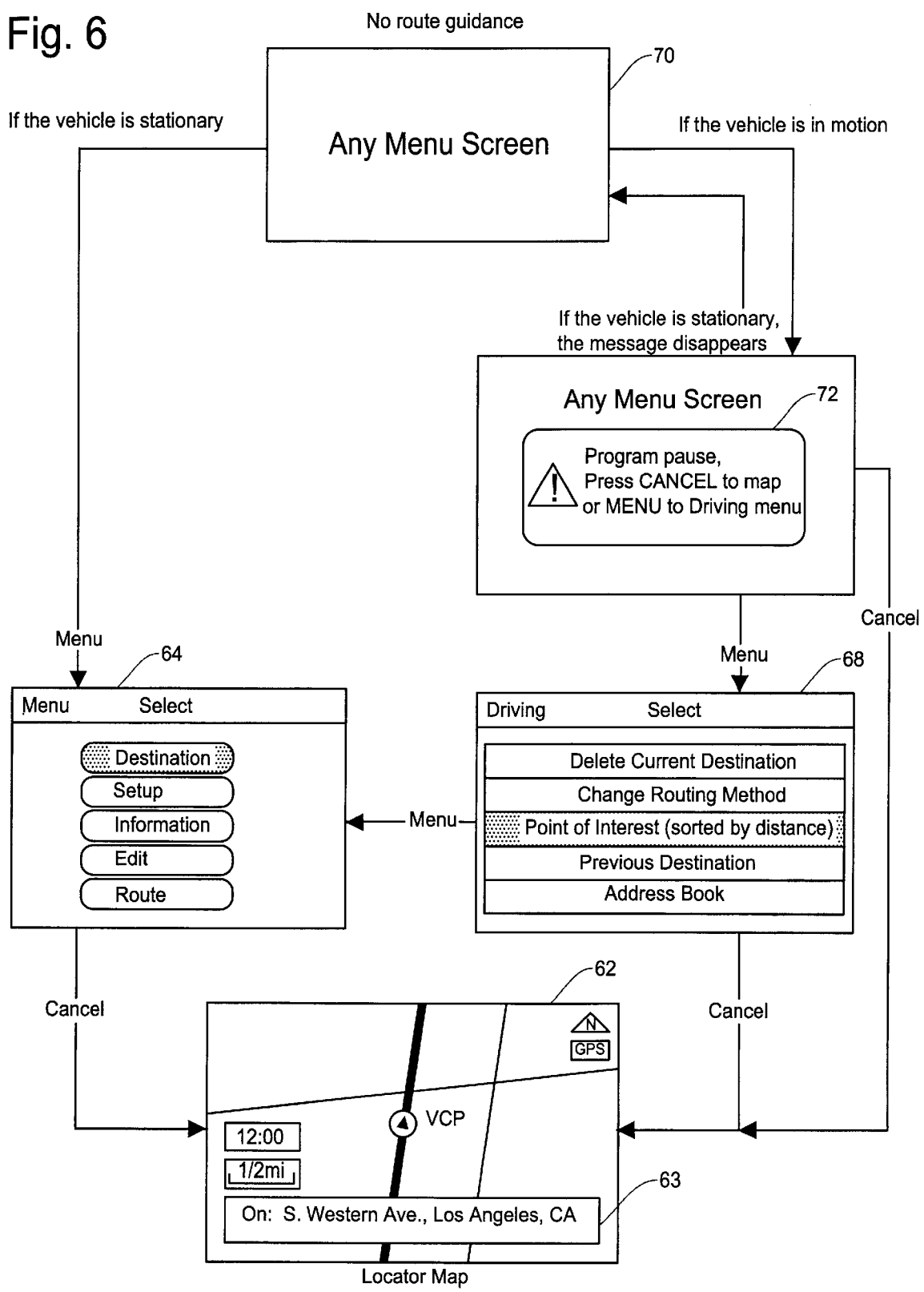
FIG. 6 is a schematic diagram showing another example of displayed images and operational flow in the navigation system of the present invention, which is dependent upon whether the vehicle is in motion or stationary, when the destination is not specified.

FIG. 6 shows an operational flow and display examples in the navigation system of the present invention. Similar to the situation of FIG. 5, the destination of the travel is not specified in the navigation system. Thus, as shown in the lower half of FIG. 6, the relationships between the locator map screen 62 and the in-motion main menu 68 (when the vehicle is in motion) or between the locator map screen 62 and the main menu 64 (when the vehicle is stationary) are the same as that shown in FIG. 5.

When the navigation system is in any menu screen 70, for example, in one of the stationary break down menus, and when the vehicle starts moving, the navigation system detects that the vehicle is in motion. Such an in-motion detection is made, for example, by the point measuring device 43 of FIG. 3 by counting wheel rotation pulses by the vehicle speed sensor therein. Then, the navigation system overlaps a special image such as a warning message 72 on the current menu screen. An example of warning message 72 is "Program pause. Press CANCEL to map or MENU to driving menu". This warning message remains until the menu key 47b or cancel key 47c is pressed. If the vehicle stops, the warning message 72 disappears. When the menu key 47b is pressed, the navigation system displays the in-motion main menu 68. When the cancel key 47c is pressed, the navigation system displays the locator map screen 62.

Figure 7:
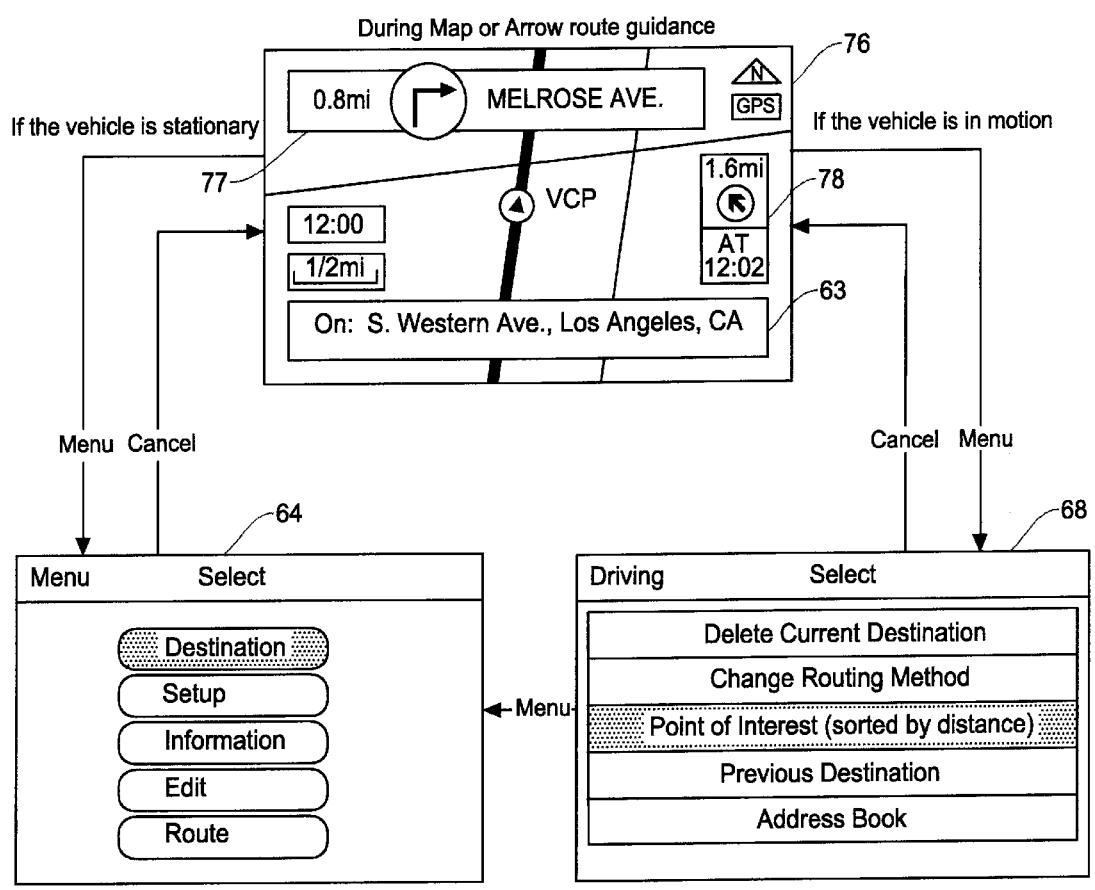
FIG. 7 is a schematic diagram showing an example of displayed images and operational flow in the navigation system of the present invention, which is dependent upon whether the vehicle is in motion or stationary, when the destination is specified.
Figure 8:
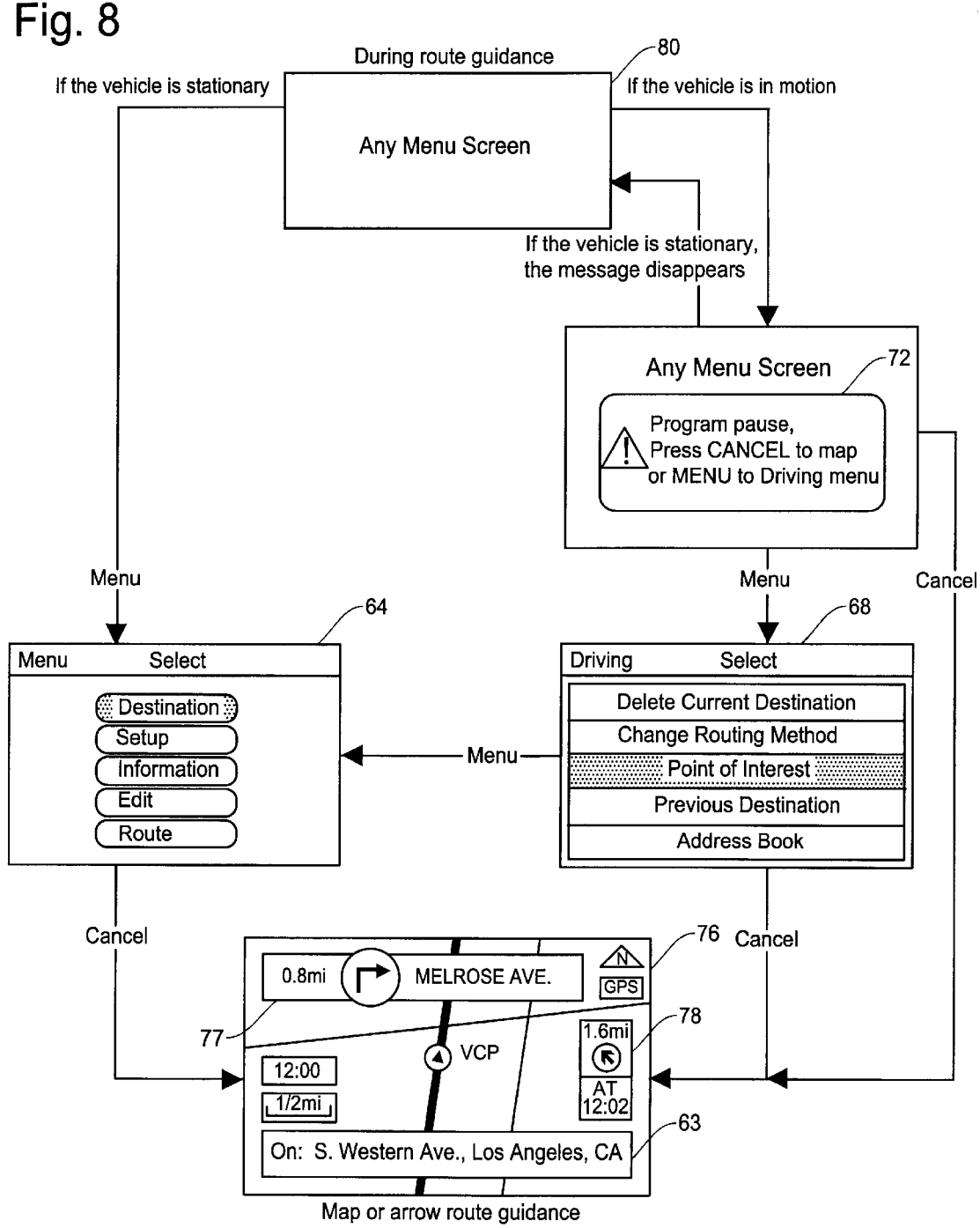
FIG. 8 is a schematic diagram showing another example of displayed images and operational flow in the navigation system of the present invention, which is dependent upon whether the vehicle is in motion or stationary, when the destination is specified.

Examples in FIGS. 7 and 8 correspond to the examples in FIGS. 5 and 6, respectively, in terms of whether the vehicle is in motion or stationary. However, FIGS. 7 and 8 are directed to the situation where the destination of travel has already been set in the navigation system. Thus, the navigation system calculates the appropriate route to the destination and displays a route guidance screen 76 such as either map route guidance or arrow route guidance. The route guidance screen 76 functions in the same way and displays the same information whether the vehicle is in motion or stationary.

In the route guidance screen 76 in FIG. 7, the current vehicle position is indicated by the vehicle current position mark VCP on the current street on which the vehicle is running. The information on the current street is shown in the information box 63. The route guidance screen 76 shows a route guidance box 77 to inform the driver which street and which direction to turn the vehicle. For example, the route guidance box 77 shows the name of the street "MELROSE AVE" that intersects with the current street on which to make a turn, a direction of turn (left or right), and a distance to the intersection. The route guidance screen 76 further includes an information box 78 which shows a distance to the final destination and an anticipated time to reach the final destination. Such information can also be provided to the driver by spoken guidance.

After specifying the destination, the driver may want to change the destination because of various reasons. When the vehicle is stationary, by pressing the menu key 47a, the navigation system goes to the stationary main menu 64. The navigation system performs any functions incorporated in the system as long as the vehicle is stationary. Thus, it is possible to display all of the information such as names of the possible destinations in several ten pages of name lists by scrolling the pages of the display or write the name and/or address of a new destination through the keyboard screen such as shown in FIG. 2F.

However, when the vehicle is in motion, the navigation system provides only limited functions so that efficient key operations can be achieved. Thus, by pressing the menu key 47b, the navigation system displays the in-motion (driving) main menu 68. The listed items and the position of the default menu bar (highlight) in the in-motion main menu 68 are described above with reference to FIG. 5. In the example of FIG. 7, unlike the example in FIGS. 5 and 6, the items of "Delete Current Destination" and "Change Routing Method" in the in-motion main menu 68 are active because the destination is already set in the navigation system. As noted above, the initial highlight is positioned at about center of the item list so that the selection of item in either an upward direction or a downward direction (or a diagonal direction in an example of FIG. 13) can be made with a small number of key strokes (clicks of remote controller 47).

FIG. 8 shows an operational flow and display examples in the navigation system in which, similar to the situation of FIG. 7, the destination of the travel has already been specified in the navigation system. Thus, in the lower half of FIG. 8, the relationships between the route guidance screen 76 and the in-motion main menu 68 (when the vehicle is in motion) or between the route guidance screen 76 and the stationary main menu 64 (when the vehicle is stationary) are the same as that shown in FIG. 7.

When the navigation system is in any menu screen 80, for example, one of the stationary break down menus, and when the vehicle starts moving, the navigation system detects that the vehicle is in motion rather than stationary by the point measuring device 43 of FIG. 3. Then, the navigation system overlaps the warning message 72 on the current menu screen. The warning message 72 may be the same as that shown in FIG. 6, and remains until either the menu key 47b or cancel key 47c is pressed. If the vehicle stops, the warning message 72 will disappear. When the menu key 47b is pressed, the navigation system displays the in-motion (driving) main menu 68. When the cancel key 47c is pressed, the navigation system goes to the route guidance screen 76.

Figure 9:
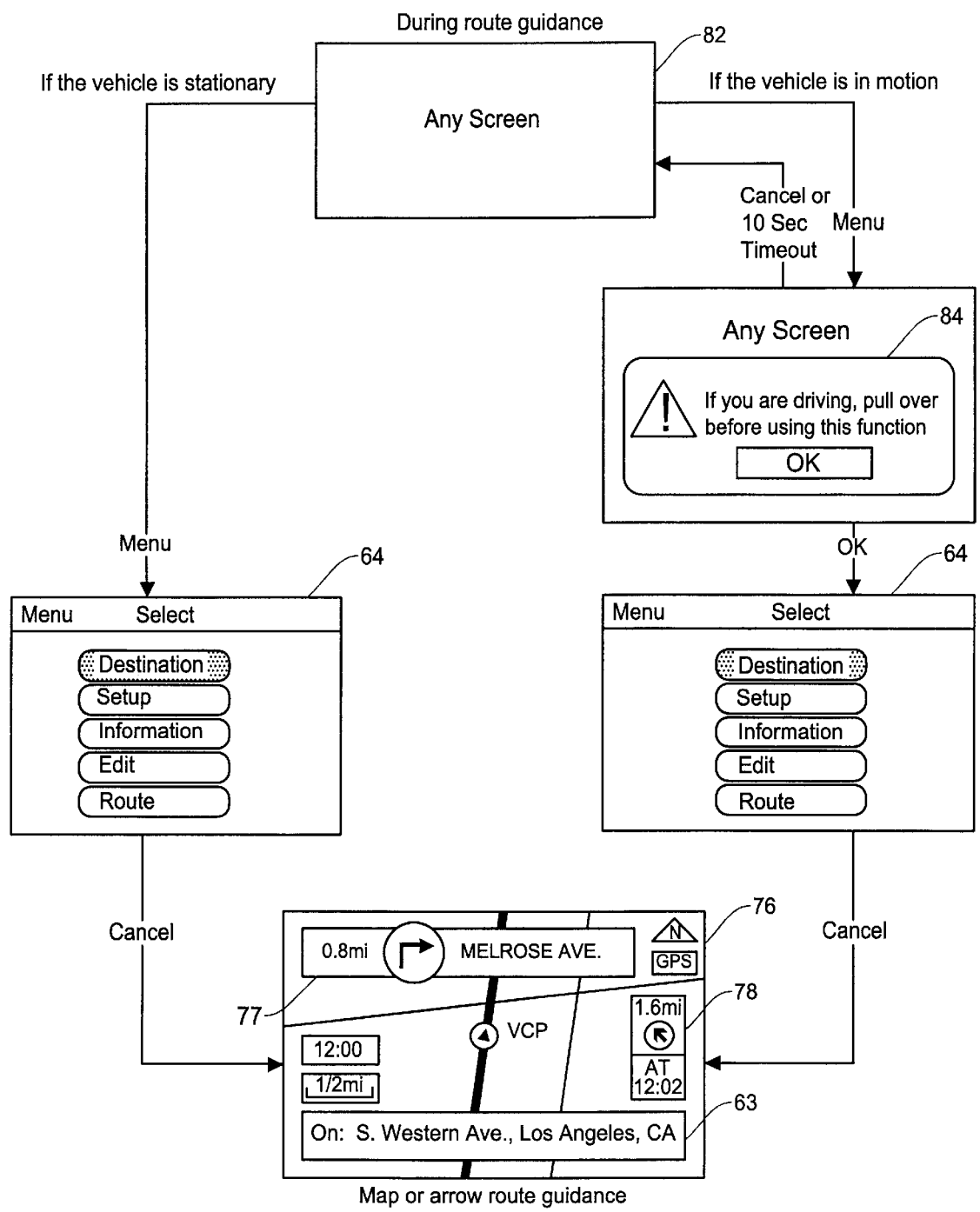
FIG. 9 is a schematic diagram showing an example of displayed images and operational flow in the navigation system of the present invention designed for a situation where a passenger operates the navigation system.

Suppose there is a passenger in the vehicle, and the passenger wants to assist the driver by operating the navigation system, it may be reasonable that the navigation system be fully functional even when the vehicle is running. FIG. 9 shows display examples and operational flows in such a situation. At any menu screen 82, for example, in one of the stationary break down menus, if the vehicle is running and the menu key 47a is pressed, a warning message 84 appears is on the current screen. In this example, the warning message states that "If you are driving, pull over before using this function" which may remain for a predetermined period of time and go back to the current screen 82. A passenger may select an OK mark in the warning message 84 because the passenger is not driving the vehicle. This brings the navigation system to the stationary main menu 64, and through the stationary main menu 64, to other break down menus of more detailed information, display scrolling, and data writing, and etc. Therefore, under a special circumstance where a person other than the driver operates the navigation system, the navigation system can provide all of the functions even when the vehicle is in motion.

Figure 10A:
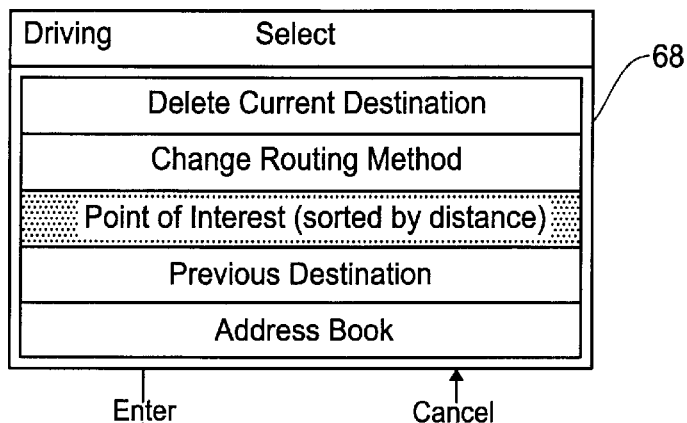
FIGS. 10A–10D are schematic diagrams showing display examples and operational flow involved in a process for specifying a destination in the navigation system of the present invention when the vehicle is in motion.

FIGS. 10A–10D show examples of display and operational process (from in-motion main menu to in-motion break down menu) in the navigation system of the present invention when the vehicle is in motion (driving). When the vehicle is in motion, each menu or list is structured with only one page screen so that no page scroll is available in the operation. FIG. 10A is the in-motion main menu 68 that is also shown in FIGS. 5–9 in which limited number of items, such as five items, are shown in the menu. Further, the default highlight position is on the "Point of Interest" on the third line of the list, i.e., about the center of the list.

Figure 10B:
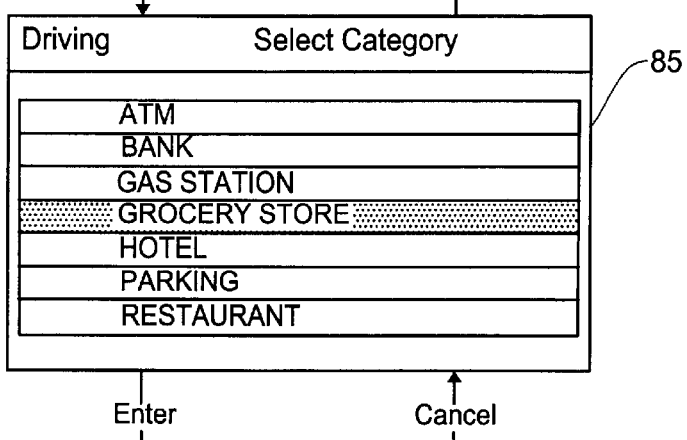

By selecting the "Point of Interest" in FIG. 10A, the navigation system displays a "Select Category" menu 85 in which several categories in the point of interest are listed as shown in FIG. 10B. In this example, the "Select Category" menu 85 shows seven categories in which an initial highlight position is on the fourth line "GROCERY STORE" of the list. Suppose an initial highlight position is the first line "ATM", and the driver wants to select the category in the last line "RESTAURANT", he has to click the joystick key 47a six times. In the present invention, however, the driver can select the "RESTAURANT" by clicking only three times which requires a substantially shorter time, thereby promoting the safe drive.

In FIG. 10B, the list of categories is limited to one page, and thus, no scroll function is available. Such preset categories are specified by a user in the "Setup" process in the stationary main menu 64 while the vehicle is stationary. Further, the order of listing the categories is freely determined by the user in the "Setup" process above. Thus, if the user anticipates that a certain category such as "RESTAURANT" is the most frequently used category, it is preferable that the item "RESTAURANT" is listed at the fourth line or middle point of the "Select Category" menu 85 to be highlighted at default.

The list of categories in the "Select Category" menu 85 in FIG. 10B is merely an example. The user can freely specify the categories in the "Setup" process noted above. Other possible preset categories include "EMERGENCY" (police, hospital), "REST ROOM" (gas station, grocery store, hotel, restaurant, shopping center, part, rest area, etc), "HOSPITAL", and etc. Further, two or more same category with different contents may be listed in this menu, for example, "RESTAURANT(1)" for Chinese, Japanese or Korean food, and "RESTAURANT(2)" for Italian, Mexican or American food, and the like.

Figure 10C:
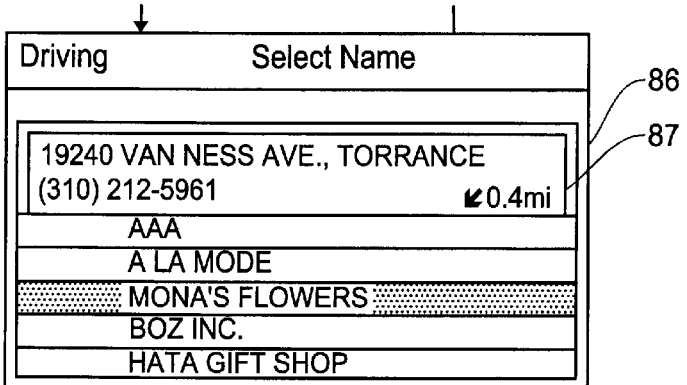

By selecting one of the categories, "GROCERY STORE" for example, the navigation system displays a list of names in the selected category in a "Select Name" menu 86 of FIG. 10C. In this example, only five names sorted by distance (within a predetermined distance of search area) are shown in the list. Thus, a combination of five names may change when the vehicle position changes. The list is formed only by one page and thus no scrolling is available. The initial highlight position is a third line (middle) of the list, thereby requiring a small number of clicks in selecting the names in either an upward or downward direction in the list.

The "Select Name" menu 86 includes an address information box 87 which shows an address, phone number, a direction by an arrow, and a distance to the name highlighted in the name list. The information in the box 87 is updated every time when the user moves the highlight through the name list. To minimize the driver's time to review the information, the address information box 87 may not show the exact street address and phone number. Possible combinations of abridged address information include (1) street name and city name (no address number or phone number), (2) street name and nearest cross street name (no address number, city name or phone number), (3) street name, cross street name and city name (no address number or phone number), and (4) name of shopping mall when available, and city name (no street address, or phone number). Further, the direction and distance from the current vehicle position may or may not be included in the address information box 87.

As noted above, the names in the list in the "Select Name" menu 86 is sorted by the distance from the current vehicle position. The list may be updated in real-time as the vehicle travels. This may provide accurate information to the driver, however, the order of names in the list varies in real-time, which may confuse the driver. Thus, as an alternative, once the list of five names is displayed, the list may remain unchanged until pressing the cancel key 47c.

In the example of FIG. 10C, the list shows five names in the selected category. The initial highlight position is third line. By the operation of the joystick key 47a, the highlight may loop from the top row to the bottom row, or vice versa, so that the user can review the entire five addresses (address information box 87) on the screen in four highlight movements. In a rural area, the list may show names fewer than five names within a predetermined distance of search area. In such an instance, the initial highlight position may be at the top or middle of the list.

Figure 10D:
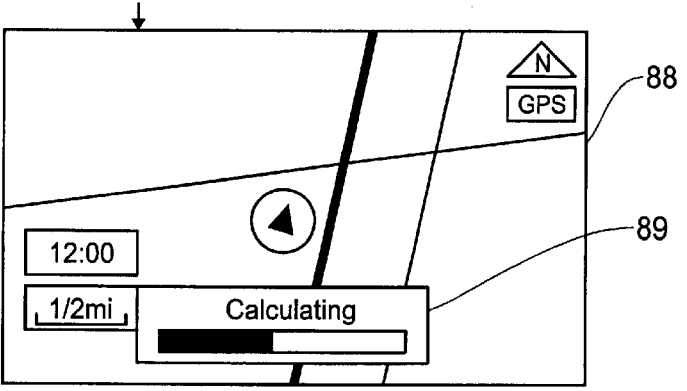

By specifying the name of the destination in the "Select Name" menu 86, the navigation system changes to a confirm destination screen 88 in FIG. 10D wherein the CPU 49 (FIG. 3) calculates the optimum route to the destination. The route to the destination may be determined based on, for example, whether it requires the shortest time, it includes many freeways as possible, or it includes few toll roads as possible, or the like. In this example, the navigation system displays the locator map on which a time scale 89 is shown during the route calculation to show the progress of the calculation. After the calculation, the navigation system displays the route guidance screen 76 such as shown in FIGS. 7 and 8.

Figure 11A:
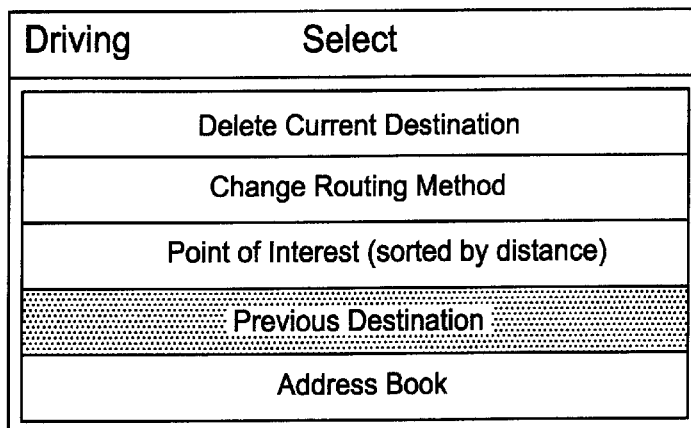
FIGS. 11A–11C are schematic diagrams showing display examples and operational flow involved in a process for specifying a destination in the navigation system of the present invention when the vehicle is in motion.
Figure 11B:
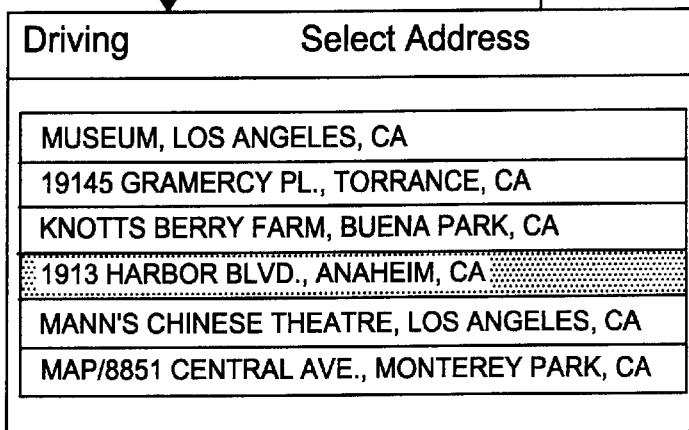
Figure 11C:
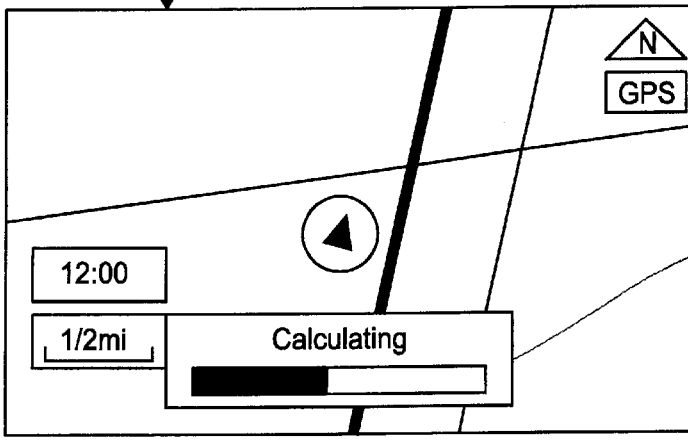

FIGS. 11A–11C show further examples of display and operational process (from in-motion main menu to in-motion break down menu) in the navigation system of the present invention when the vehicle is in motion. FIGS. 11A–11C show a situation where the "Previous Destination" is selected as a method of selecting the destination. Thus, in the in-motion main menu 68 of FIG. 11A, by moving the highlight to the "Previous Destination" and pressing the enter (joystick) key 47a, the navigation system displays a "Select Address" menu 92 of FIG. 11B.

In the example of FIG. 11B, the "Select Address" menu 92 lists names and addresses of the previous destinations which are sorted in the order of time., i.e., from the most recent destination to the earlier destinations. The list is limited to a predetermined number, such as seven, of addresses, and does not scroll. The initial highlight position is on the third or fourth line, i.e, at about the middle point of the list so that the user can select the address in the upward or downward by a small number of highlight movements (clicks of the joystick 47a) in average. Alternatively, the initial highlight position may be above the middle line, slightly closer to the most recent destination, since the most recent destinations can be assumed to have a higher frequency of repeated use. By the operation of the joystick 47a, the highlight may loop from the top row to the bottom row, or vice versa, so that the user can review the entire seven addresses on the screen in six highlight movements.

By specifying the address of the destination in the "Select Address" menu 92, the navigation system changes to a confirm destination screen 88 in FIG. 11C wherein the CPU 49 (FIG. 3) calculates the optimum route to the destination. This screen is the same as that of FIG. 10D wherein the navigation system displays the locator map with the time scale 89 during the route calculation. After the calculation, the navigation system displays the route guidance screen 76 such as shown in FIGS. 7 and 8.

Figure 12A:
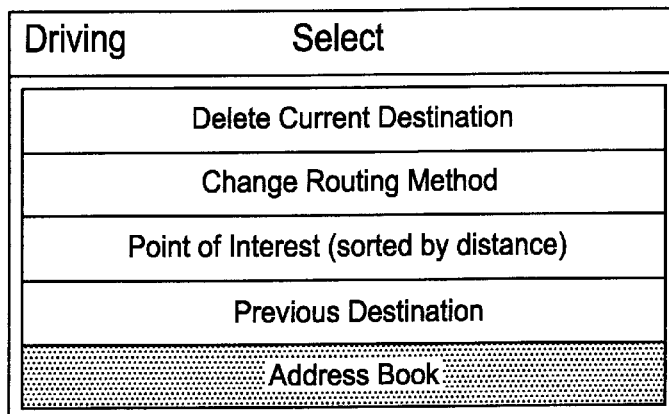
FIGS. 12A–12C are schematic diagrams showing display examples and operational flow involved in a process for specifying a destination in the navigation system of the present invention when the vehicle is in motion.
Figure 12B:
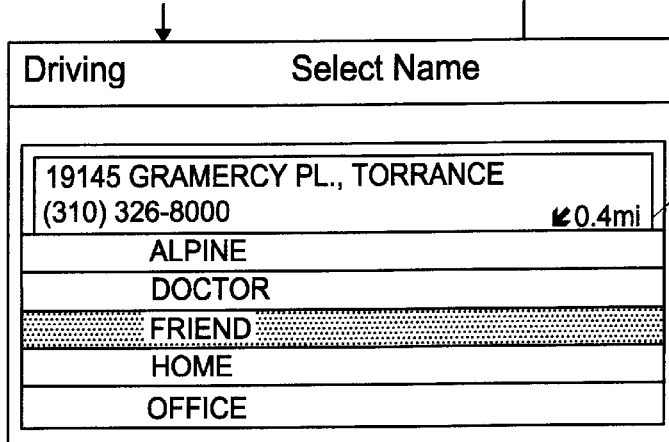
Figure 12C:
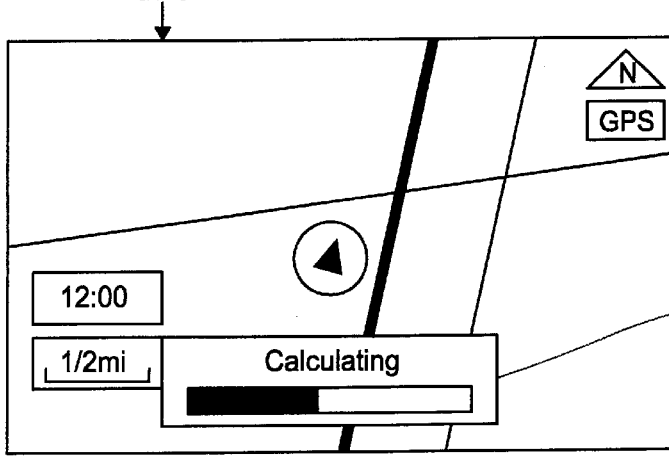

FIGS. 12A–12C show further examples of display and operational process (from in-motion main menu to in-motion break down menu) in the navigation system of the present invention when the vehicle is in motion. FIGS. 12A–12C show a situation where the "Address Book" is selected as a method of selecting the destination. Thus, in the in-motion main menu 68 of FIG. 12A, by moving the highlight to the "Address Book" and pressing the enter (Joystick) key 47a, the navigation system displays a "Select Name" menu 94 shown in FIG. 12B.

In the example of FIG. 12B, the "Select Name" menu 94 lists names in the address book which are sorted in the alphabetical order. The order of listing the name can be changed in an "Edit" menu in the main menu 64 when the vehicle is stationary. The list in FIG. 12B is limited to a predetermined number of names, such as five, and does not scroll. The initial highlight position is on the third line, i.e, at the middle point of the list so that the user can select the address in the upward or downward by a small number of highlight movements (clicks of the joystick 47a) in average. By the operation of the joystick key 47a, the highlight may loop from the top row to the bottom row, or vice versa, so that the user can review the entire five names on the screen in four highlight movements.

The "Select Name" menu 94 includes an address information box 87 which shows an address, phone number, a direction by an arrow, and a distance to location of the name highlighted in the name list. The information in the box 87 is updated every time when the user moves the highlight through the name list. The information in the address information box 87 may be simplified or abridged to minimize the driver's time to review the information. Alternatively the address information box 87 may be removed from the "Select Name" menu 94 to be similar to the previous destination list of FIG. 11B.

By specifying the address of the destination in the "Select Names" menu 94, the navigation system changes to a confirm destination screen 88 in FIG. 12C wherein the CPU 49 (FIG. 3) calculates the optimum route to the destination. This screen is the same as that of FIGS. 10D and 11C wherein the navigation system displays the locator map with the time scale 89 during the route calculation in which the time scale 89 shows the progress of the route calculation. After the route calculation, the navigation system displays the route guidance screen 76 such as shown in FIGS. 7 and 8.

Figure 13:
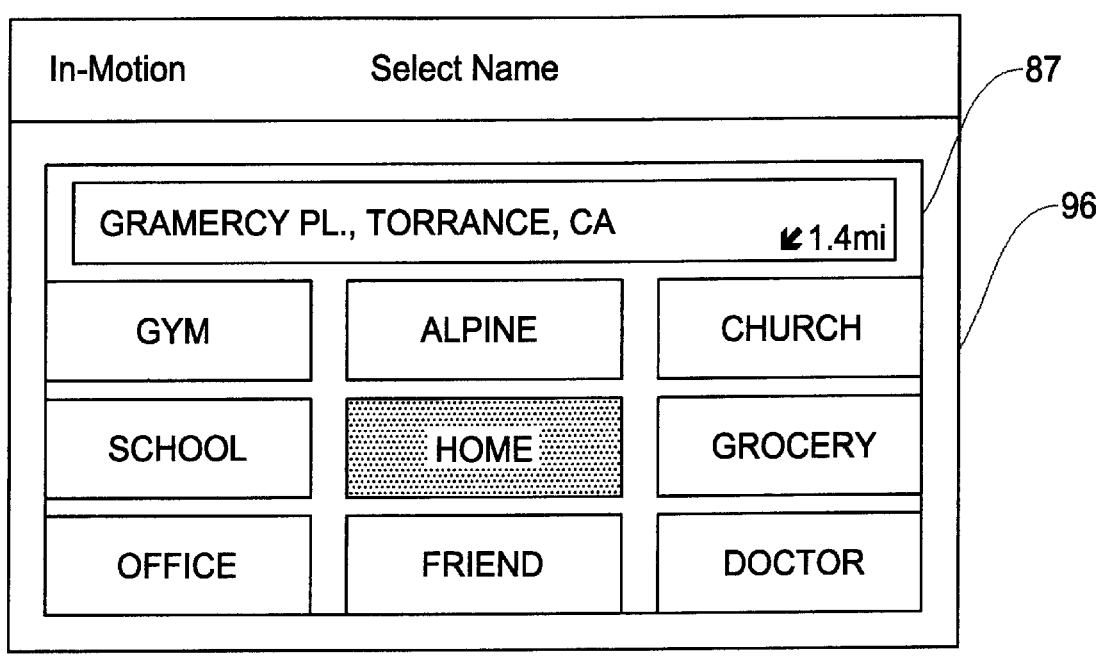
FIG. 13 is a schematic diagram showing an example of display involved in a process for specifying a destination in the navigation system of the present invention with a lesser number of clicks.

FIG. 13 shows a further example of screen layout listing a plurality of names in a "Select Name" menu 96 in the address book or in the specified category of point of interest in the selection process of the destination. This example allows up to nine items in a 3-by-3 matrix and the initial highlight position is at the center. It increases the maximum number of entries in a single screen while minimizing the highlight movements to at most two while the vehicle is in motion. In this example, since the initial highlight position is at the center, any item in the list can be selected by only one click of the joystick 47a in either an upward, downward, right, left, or diagonal direction in the list.

The information in the address information box 87 is abridge to reduce the amount of non-essential information in the screen for safety considerations while driving. While the vehicle is in motion, it can be assumed that the driver is not likely interested as much in the detailed address information (including the direction and distance from the current vehicle position) as in reaching the destination. Also, the user-specified names in the address book can be assumed sufficient for the user to recognize and identify without further details. Thus, the simplified information in the address information box 87 is considered sufficient.

As has been described, according to the present invention, the navigation system is designed to promote safe driving by differentiating display forms and contents depending on whether the vehicle is in motion or stationary. When the vehicle is stationary, the navigation system can perform all of the functions. In contrast, when the vehicle is in motion, the navigation system provides simplified and limited functions to ease the operations. The number of key strokes required for operating the navigation system is reduced when the vehicle is in motion.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method of a vehicle navigation system for assisting a driver to drive the vehicle, comprising the following steps of:
    detecting whether a vehicle is in motion or stationary and sending a corresponding signal to a controller of the navigation system;
    changing a display screen of the navigation system to an in-motion main menu when the vehicle is in motion and a menu key is pressed by the driver; and
    changing the display screen of the navigation system to a stationary main menu when the vehicle is stationary and the menu key is pressed by the driver;
    wherein the in-motion main menu displays an item list showing less than a predetermined number of items in one page for specifying a destination.

2. A display method of a vehicle navigation system as defined in claim 1, wherein a display scroll function is disabled when the vehicle is in motion.

3. A display method of a vehicle navigation system as defined in claim 1, wherein the vehicle navigation system disables a key input method of selecting the destination by inputting characters or numbers through a key board when the vehicle is in motion while enabling the key input method when the vehicle is stationary.

4. A display method of a vehicle navigation system as defined in claim 1, wherein items in the item list in the in-motion main menu are limited to methods of specifying the destination.

5. A display method of a vehicle navigation system as defined in claim 1, wherein the predetermined number of methods shown in the item list in the in-motion main menu is ten or less.

6. A display method of a vehicle navigation system as defined in claim 1, wherein an initial highlight position is on a middle point of the item list in the in-motion main menu, and the highlight is moved in either an upward, downward, right or left direction on the item list by an operation of a control key of the navigation system.

7. A display method of a vehicle navigation system as defined in claim 1, further comprising a step of displaying a category list showing categories of destination when an item of point of interest in the in-motion main menu is selected when the vehicle is in motion, wherein the category list includes less than a predetermined number of categories of the destination in one page of the display screen, and wherein a display scroll function for the category list is disabled when the vehicle is in motion.

8. A display method of a vehicle navigation system as defined in claim 7, and wherein an initial highlight position is on a middle point of the category list, and the highlight is moved in either an upward, downward, right or left direction on the category list by an operation of a control key of the navigation system.

9. A display method of a vehicle navigation system as defined in claim 8, and a number of categories in the category list is ten or less.

10. A display method of a vehicle navigation system as defined in claim 7, further comprising a step of displaying a name list showing names of destination when one of the categories in the list of categories is selected, wherein the name list includes less than a predetermined number of names of the destination in one page of the display screen, an address information box indicating an address of one of the names highlighted by an operation of a key, and wherein the display scroll function for the name list is disabled when the vehicle is in motion.

11. A display method of a vehicle navigation system as defined in claim 10, wherein a number of names in the name list is less than ten, and wherein an initial highlight position is on a middle point of the name list, and the highlight is moved in either an upward, downward, left or right direction on the name list by an operation of a control key of the navigation system.

12. A display method of a vehicle navigation system as defined in claim 1, further comprising a step of displaying destination history list showing destination points when an item of destination history ("previous destination") in the in-motion main menu is selected, wherein the address list includes less than a predetermined number of addresses of the destination in one page of the display; screen, and wherein a display scroll function for the address list is disabled when the vehicle is in motion.

13. A display method of a vehicle navigation system as defined in claim 12, wherein a number of addresses in the address list is less than ten, and wherein an initial highlight position is on a middle point of the address list, and the highlight is moved in either an upward, downward, right or left direction on the address list by an operation of a control key of the navigation system.

14. A display method of a vehicle navigation system as defined in claim 1, further comprising a step of displaying a name list showing names of registered points when an item of registered points ("address book") in the in-motion main menu is selected, wherein the name list includes less than a predetermined number of names of the destination in one page of the display screen, an address information box indicating an address of one of the names highlighted by an operation of a key, and wherein the display scroll function for the name list is disabled when the vehicle is in motion.

15. A display method of a vehicle navigation system as defined in claim 14, wherein a number of names in the name list is less than ten, and wherein an initial highlight position is on a middle point of the name list, and the highlight is moved in either an upward, downward, right or left direction on the name list by an operation of a control key of the navigation system.

16. A display method of a vehicle navigation system as defined in claim 14, the names in the name list are arranged in positions formed of three-by-three matrix, and the initial highlight position is at a center of the matrix, and the highlight is moved in either an upward, downward, right, left or diagonal direction on the name list by an operation of a control key of the navigation system.

17. A display method of a vehicle navigation system as defined in claim 1, further comprising a step of displaying a locator map screen when the destination of travel is not set in the navigation system, wherein the locator map screen displays a map image of an area within a predetermined distance from the vehicle and a vehicle current position mark in the map image showing a current position of the vehicle and a street image on which the vehicle is running.

18. A display method of a vehicle navigation system as defined in claim 17, wherein the locator map screen further includes information showing a name of the street on which the vehicle is running.

19. A display method of a vehicle navigation system as defined in claim 1, further comprising a step of displaying a route guidance screen when the destination of travel is set and an appropriate route to the destination is determined by the navigation system, wherein the route guidance screen displays a map image of an area within a predetermined distance from the vehicle and a vehicle current position mark in the map image showing a current position of the vehicle, an image of a current street on which the vehicle is running, a name of a cross street on which the vehicle is to make a turn, and a direction of the turn on the cross street.

20. A display method of a vehicle navigation system as defined in claim 19, wherein the route guidance screen further includes information showing a name of the street on which the vehicle is running, a distance to the cross street, and a distance to the destination.

21. A display method of a vehicle navigation system as defined in claim 1, further comprising a step of displaying a warning message when the navigation system detects that the vehicle is in motion and suspending an operation of a menu screen that is designed to be used when the vehicle is stationary.

22. A display method of a vehicle navigation system as defined in claim 1, further comprising a step of displaying a warning message when the navigation system detects that the vehicle is in motion and suspending an operation of a menu screen that is designed to be used when the vehicle is stationary, and enabling the main menu when a passenger of the vehicle is to operate the navigation system.

23. A display method of a vehicle navigation system for assisting a driver to drive the vehicle, comprising the following steps of:

displaying a locator map screen when a destination of travel is not set in the navigation system, the locator map screen displaying a map image of an area surrounding the vehicle and a vehicle current position in the map image and a street image on which the vehicle is running;

detecting whether a vehicle is in motion or stationary and sending a corresponding signal to a controller of the navigation system;

changing a display screen of the navigation system to an in-motion main menu when the vehicle is in motion and a menu key is pressed by the driver;

changing the display screen of the navigation system to a stationary main menu when the vehicle is stationary;

specifying the destination in the navigation system through break down menus designed for either in motion or stationary of the vehicle; and displaying a route guidance screen when the destination of travel is set and an appropriate route to the destination is determined by the navigation system;

wherein each of the break down menus displayed when the vehicle is in motion has listed items less than a predetermined number which are shown in one page of display screen for which a display scroll function is disabled.

24. A display method of a vehicle navigation system as defined in claim 23, wherein the vehicle navigation system disables a key input method of selecting the destination by inputting characters or numbers through a key board when the vehicle is in motion while enabling the key input method when the vehicle is stationary.

25. A display apparatus of a vehicle navigation system for assisting a driver to drive the vehicle, comprising:

means for detecting whether a vehicle is in motion or stationary and sending a corresponding signal to a controller of the navigation system;

means for changing a display screen of the navigation system to an in-motion main menu when the vehicle is in motion and a menu key is pressed by the driver;

means for displaying in-motion break down menus specifically made for use when the vehicle is in motion, the break down menus starting from the in-motion main menu;

means for changing the display screen of the navigation system to a stationary main menu when the vehicle is stationary; and means for displaying stationary break down menus made for use when the vehicle is stationary, the break down menus starting from the stationary main menu;

wherein each of the in-motion main menu and the in-motion break down menus displays an item list in one page of a display screen for which a display scroll function is disabled when the vehicle is in motion.

26. A display method of a vehicle navigation system as defined in claim 25, wherein the vehicle navigation system disables a key input method of selecting the destination by inputting characters or numbers through a key board when the vehicle is in motion while enabling the key input method when the vehicle is stationary.

27. A display apparatus of a vehicle navigation system as defined in claim 25, wherein each of the in-motion main menu and the in-motion break down menus displays an item list in one page of a display screen on which an initial highlight is positioned at about a middle point of the item list, and the highlight is moved in either an upward, downward, right or left direction on the item list by an operation of a control key of the navigation system.

28. A display apparatus of a vehicle navigation system as defined in claim 25, wherein each of the in-motion main menu and the in-motion break down menus displays an item list in one page of a display screen in which about seven or less items are listed on which an initial highlight is positioned at about a middle point of the item list.

29. A display apparatus of a vehicle navigation system as defined in claim 25, wherein each of the in-motion main menu and the in-motion break down menus displays an item list in one page of a display screen in which about five or less items are listed on which an initial highlight is positioned at about a middle point of the item list.

30. A display apparatus of a vehicle navigation system as defined in claim 25, wherein each of the in-motion main menu and the in-motion break down menus displays an item list in one page of a display screen in which a plurality of items are arranged in positions formed in a matrix form, and an initial highlight position is on a center of the matrix.

31. A display apparatus of a vehicle navigation system as defined in claim 30, the matrix is a three-by-three matrix capable of listing nine items in which the initial highlight position is on the center of the matrix, and the highlight is moved in either an upward, downward, right, left or diagonal direction on the item list by an operation of a control key of the navigation system.

32. A display apparatus of a vehicle navigation system as defined in claim 25, further comprising means for displaying a locator map screen when the destination of travel is not set in the navigation system, wherein the locator map screen displays a map image of an area within a predetermined distance from the vehicle and a vehicle current position mark in the map image showing a current position of the vehicle and a street image on which the vehicle is running.

33. A display apparatus of a vehicle navigation system as defined in claim 25, further comprising means for displaying a route guidance screen when the destination of travel is set and an appropriate route to the destination is determined by the navigation system, wherein the route guidance screen displays a map image of an area within a predetermined distance from the vehicle and a vehicle current position mark in the map image showing a current position of the vehicle, an image of a current street on which the vehicle is running, a name of a cross street on which the vehicle is to make a turn, and a direction of the turn on the cross street.

34. A display method of a vehicle navigation system as defined in claim 25, wherein the route guidance screen further includes information showing a name of the street on which the vehicle is running, a distance to the cross street, and a distance to the destination.

35. A display method of a vehicle navigation system as defined in claim 25, further comprising means for displaying a warning message when the navigation system detects that the vehicle is in motion and suspending an operation of a menu screen that is designed to be used when the vehicle is stationary.

36. A display method of a vehicle navigation system as defined in claim 25, further comprising means for displaying a warning message when the navigation system detects that the vehicle is in motion and suspending an operation of a menu screen that is designed to be used when the vehicle is stationary, and enabling the main menu when a passenger of the vehicle is to operate the navigation system.

* * * * *